May 6, 1952 R. E. CROSSLEY ET AL 2,595,770
ROTATING BEACON HAVING INDEPENDENTLY ADJUSTABLE
LIGHT UNITS RETRACTABLY MOUNTED FOR SERVICING
Filed May 5, 1948 4 Sheets-Sheet 3

INVENTOR.
Royal E. Crossley &
Harlow M. Pattat
BY
Bodell & Thompson
Attorneys

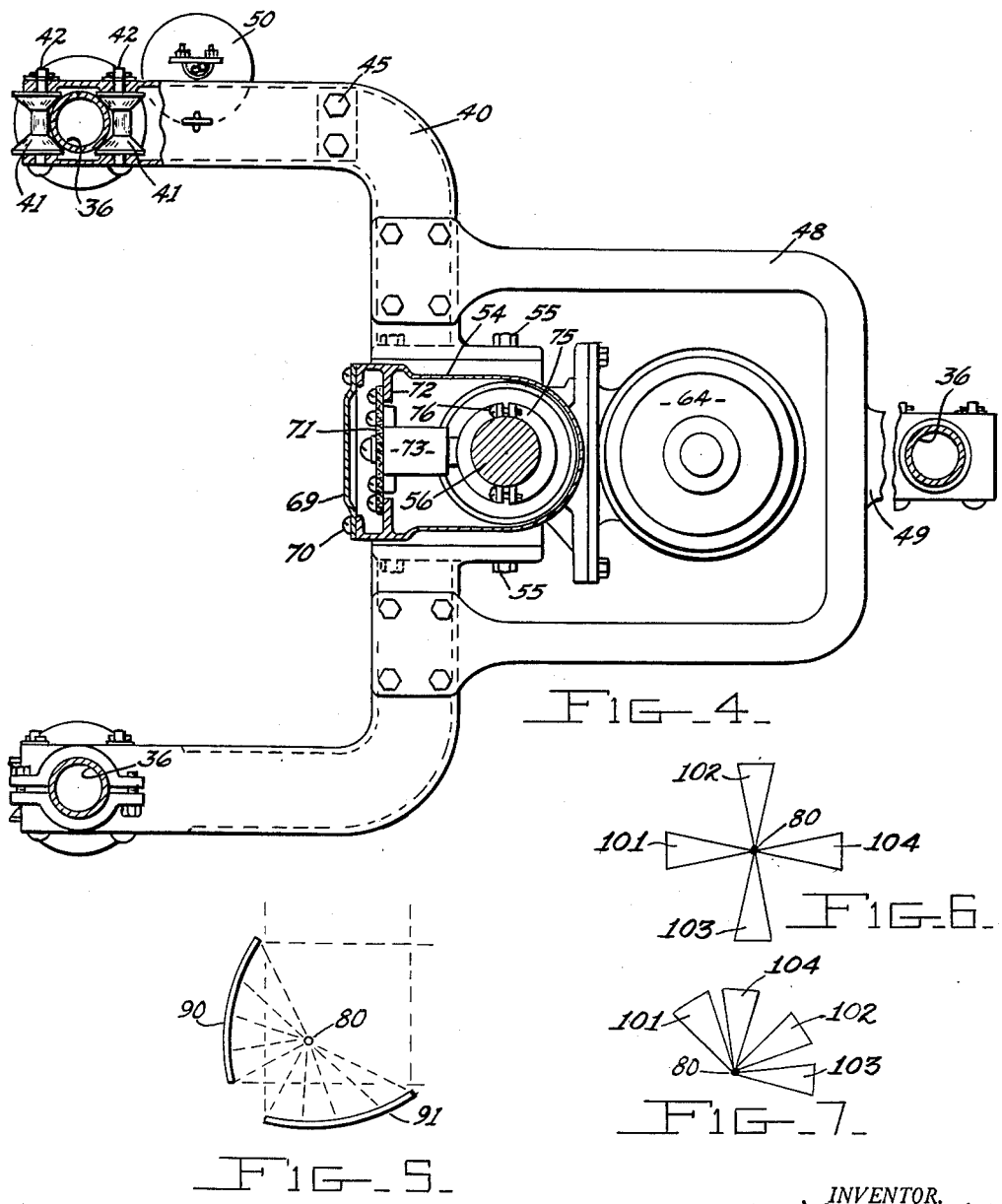

Patented May 6, 1952

2,595,770

UNITED STATES PATENT OFFICE 2,595,770

ROTATING BEACON HAVING INDEPENDENTLY ADJUSTABLE LIGHT UNITS RETRACTABLY MOUNTED FOR SERVICING

Royal E. Crossley, Fayetteville, and Harlow M. Pattat, North Syracuse, N. Y., assignors to Crouse-Hinds Company, Syracuse, N. Y., a corporation of New York Application May 5, 1948, Serial No. 25,118

4 Claims. (Cl. 240—49)

1

This invention relates to a lighting unit of the revolving beacon type intended primarily for use in lighthouses and the like.

The invention has as an object a beacon structure of the type referred to embodying an optical system by which the beacon has a relatively high light output with a relatively low wattage consumption.

The invention has as a further object a beacon structure embodying a plurality of light projecting units, each unit projecting two light beams in angular relation, and each unit being independently adjustable for any desired angular spacing of the light beams of one unit relative to the beams of the other units.

The invention has as a further object a lighting unit embodying a structure particularly well suited for mounting on the roof, or deck, of a building or the like, and having means whereby the unit may be relamped, or repaired, from within the structure.

The invention consists in the novel features and in the combinations and constructions hereinafter set forth and claimed.

In describing this invention, reference is had to the accompanying drawings in which like characters designate corresponding parts in all the views.

Figure 4 is a view taken on line 4—4, Figure 2.

Figure 5 is a diagrammatic view illustrating the arrangements of the reflectors in the lighting units.

Figure 6 is a schematic diagram illustrating the lighting units adjusted to give a uniform beam spacing.

Figure 7 is a view similar to Figure 6, with the light units adjusted to effect interlacing of the beams.

Figure 1:
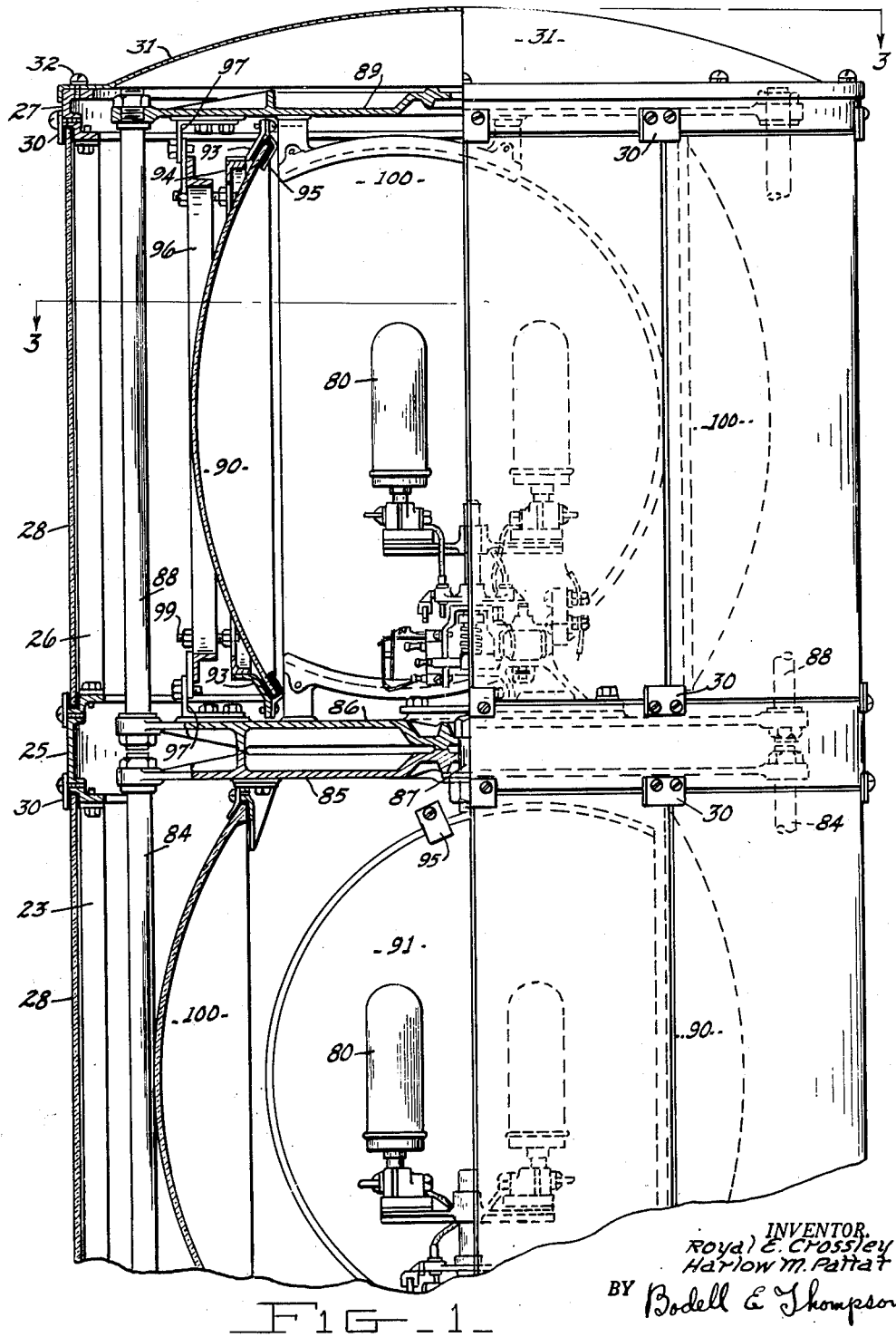
Figure 1 is an elevational view, partly in section, of a lighting unit embodying my invention.
Figure 2:
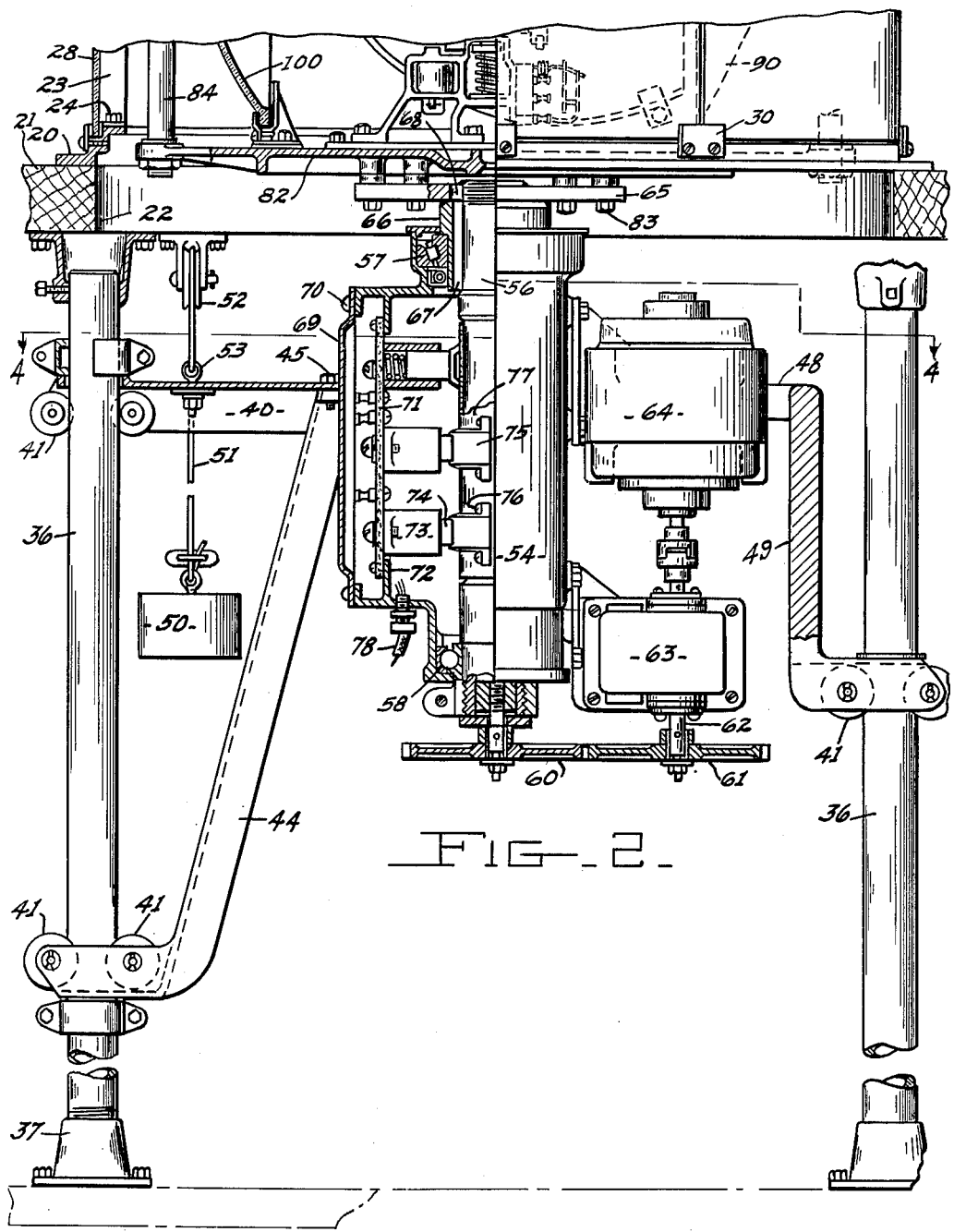
Figure 2 is a view, similar to Figure 1, of the lower portion of the structure.

The beacon comprises a weather tight transparent casing consisting of a ring 20 mounted on a roof, or deck structure 21, the ring being mounted upon the margin about an opening 22 in the deck. A plurality of upright members 23 are mounted upon the ring 20, as by screws 24. An annular member 25 is secured to the upper ends of the uprights 23, and a series of uprights 26 extend upwardly from the member 25, and are secured at their upper ends to an annular member 27. Transparent panels 28 are interposed between the ring 20 and the annular member 25, and between the annular members 25, 27, the panels being detachably secured to uprights 23, 26, by clamps 30. A cap 31 is detachably secured to the upper annular member 27, as by screws 32. This structure forms an enclosed cylindrical housing having a transparent side wall.

A plurality of supports or posts 36 depend from the under side of the deck 21. Preferably, these posts terminate in feet 37 mounted on the floor below the deck. A carriage is mounted on the supports 36 for vertical movement, and the lighting units are mounted upon this carriage. The carriage consists of a U-shaped member 40 having a pair of rollers 41 journalled in each end of the member 40 on pins 42. The rollers 41 are of spool formation and arranged to engage opposite sides of the posts 36. One or more depending braces 44 are secured to the member 40, as by screws 45. The lower end of the brace 44 is likewise provided with rollers 41. The carriage is completed by a second U-shaped bracket 48 secured at its ends to the intermediate portion of the member 40, see Figure 4, the member 48 having a depending arm 49 also provided with rollers 41 engaging the third support 36. The carriage, and the lighting units carried thereby, are counterbalanced by a weight 50 secured to a flexible strand 51 passing over a sheave 52 and secured to an eye bolt 53 mounted on the member 40.

The light projecting apparatus consists of two units, one superimposed upon the other, both units being rotatably supported by a spindle journalled vertically in a housing 54 secured to the member 40, as by screws 55. The spindle 56 is journalled in the housing on antifriction bearings 57, 58.

A gear 60 is secured to the lower end of the spindle 56 and meshes with a gear 61 secured to the output shaft 62 of a gear reduction 63 mounted on the housing 54. A motor 64, also carried by the housing, is operatively connected to the gear reduction 63 and in this manner rotation is imparted to the spindle 56. A plate 65 is secured to the upper end of the spindle, and a sleeve or cylindrical member 66 is affixed to the plate 65 and depends therefrom. The sleeve 66 is supported by the upper bearing 57 and is spaced radially outwardly from the upper end of the spindle providing an annular passage 67 between the sleeve and the spindle. The plate 65 is formed with a plurality of apertures 68.

The housing 54 is also formed with an elongated opening over which a cover plate 69 is secured, as by screws 70. A plate 71 of insulating material is detachably mounted on ribs 72 formed on the inner walls of the housing, and a plurality of brush holders 73 are mounted upon the plate 71. Each brush holder carries a brush 74 engaging a split contact ring 75 clamped about the spindle, as by screws 76. The rings 75 are insulated from the spindle 56 by an insulating sleeve 77. Current is furnished to the respective brushes 74 through a lead 78 and conductors, not shown, extend from the respective collar rings 75 upwardly through the passage 67 and aperture 68 into the lighting units, whereby the lamps 80, providing the light source for the units, are energized during the rotation of the units.

As previously stated, the light projecting apparatus consists of two separate units. A plate 82 is detachably secured to the plate 65, as by screws 83. A plurality of uprights 84 extend upwardly from the periphery of the plate 82, and a plate 85 is secured to the upper ends of the uprights 84. A plate 86 is mounted upon the top plate 85 coaxially therewith. The plates 85, 86, are secured together as by a bolt 87 which forms an axis about which the plate 86 may be rotated for adjustment relative to the plate 85. The plates 82, 85, and the connecting uprights 84 form the framework for one of the lighting units. The framework of the upper unit consists of the plate 86, uprights 88, and a top plate 89.

Each lighting unit further includes a pair of reflectors 90, 91. These reflectors are mounted in brackets 93 formed on an annular member 94, the reflectors being detachably secured to the brackets by holding clips 95. The members 94 are in turn mounted upon annular members 96 secured to the upper and lower plates 82, 85 and 86, 89, as by angle brackets 97, see Figure 1. The members 93 are mounted on the members 96 by studs 99 to provide for proper adjustment of the reflectors.

Figure 3:
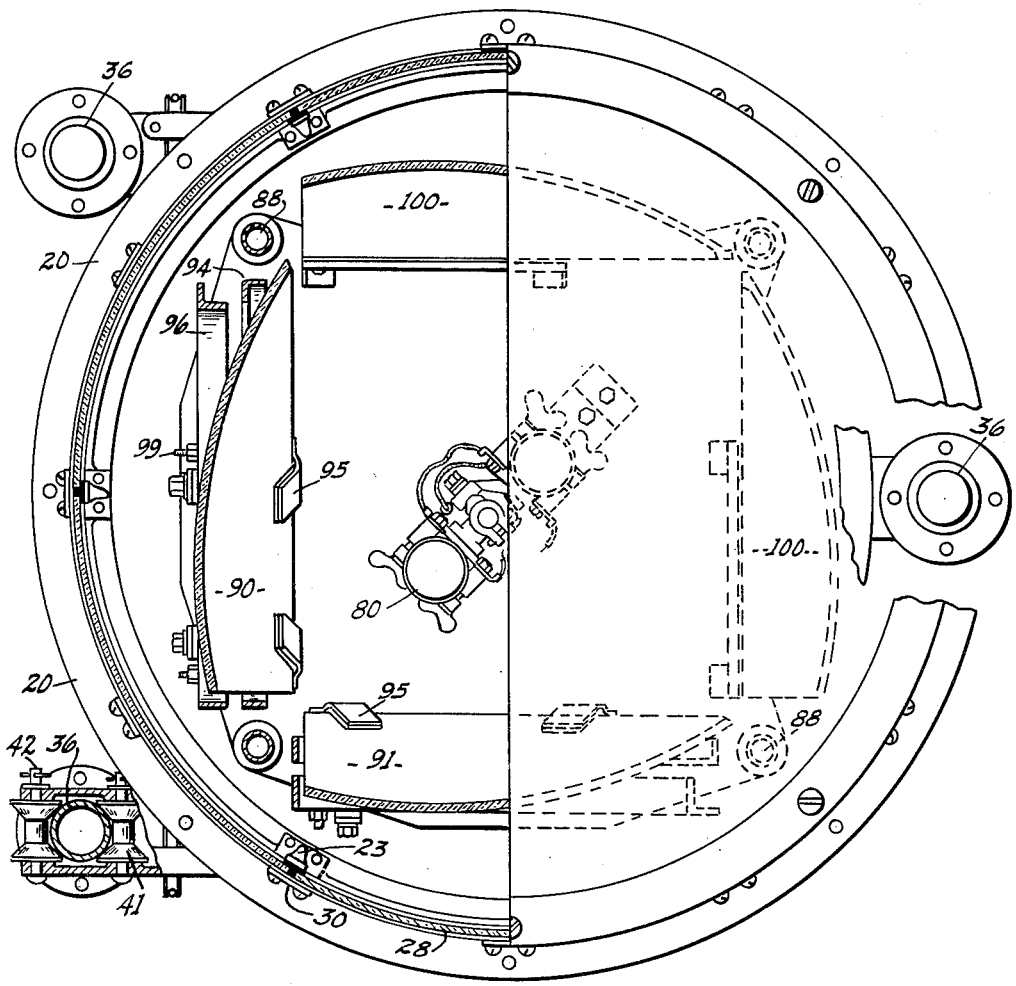
Figure 3 is a view taken on line 3—3, Figure 1.

In each unit, the reflectors 90, 91, are arranged in angular relation. As shown in Figures 3 and 5, the reflectors are arranged at right angles and the focal points of the reflectors are coincident to the light source represented by the lamp 80. With this arrangement, two beams are projected from each unit, the axis of the beams being 90° apart, as 101, 102, for one of the units, 103, 104, for the other unit.

Each unit is also and preferably provided with a spread lens 100 arranged opposite each of the reflectors 90, 91. From the description thus far, it will be apparent that both the upper and lower lighting units are rotated in synchronism by motor 64 and during such rotation each unit projects two beams spaced 90° apart. If the upper unit is adjusted about the pivot bolt 87 so that its reflectors 90, 91, are positioned 90° relative to the reflectors of the lower unit, the beacon structure will, during rotation, project four beams of light spaced apart uniformly, as shown in Figure 6. If the upper unit is so adjusted that its reflectors are in registration with the reflectors of the lower unit, the beacon structure will project two beams of light spaced 90°, or the units may be adjusted to interlace the beams, as shown in Figure 7. Accordingly, it will be apparent that a number of beam combinations can be obtained by adjusting one unit relative to the other. These beacons are often used to transmit, by the beam arrangement, signals indicating the location of the particular beacon.

The structure described is particularly well adapted to be mounted on the roof or deck of a building, such as a lighthouse, and the lighting units quickly and conveniently made available for relamping, repair, or adjustment, from within the building.

What we claim is:

1. A beacon structure including an open bottom casing formed with transparent side walls, a support positioned below said casing, a carriage mounted on said support and movable vertically toward and from the casing, a lighting unit journalled on said carriage on a vertical axis, a second lighting unit superimposed upon said first unit, each of said units including a light source and a reflector operable to project a beam laterally, the beam of said upper unit being adjustable about the vertical axis in angular relation to the beam of the lower unit, and means operable to effect rotation of said upper and lower units in synchronism.

2. A beacon structure including an open bottom casing formed with transparent side walls, a support positioned below said casing, a carriage mounted on said support, a lighting unit mounted on said carriage, a second lighting unit superimposed on said first unit and being adjustable about a vertical axis relative to said first unit, said carriage being movable vertically on said support to move said lighting units into and out of said casing, and means carried by the carriage and operable to effect rotation of said units in synchronism.

3. A beacon structure including an open bottom casing formed with transparent walls, a support positioned below said casing, a carriage mounted on said support, a spindle journalled in said carriage on a vertical axis, a lighting unit mounted on the upper end of said spindle, a second unit superimposed on said first unit, each of said units including a light source and a reflector, said upper unit being adjustable about a vertical axis relative to the lower unit, said carriage being movable vertically on said support to move said lighting units into and out of said casing, and means carried by the carriage and operable to effect rotation of said spindle.

4. A beacon structure including an open bottom casing formed with transparent walls, a support mounted below said casing, a carriage mounted on said support, a spindle journalled in said carriage on a vertical axis, a lighting unit mounted on the upper end of said spindle, a second lighting unit superimposed upon said first unit, each of said units including a pair of parabolic reflectors, the focal axis of one reflector of each pair extending in angular relation to the focal axis of the other reflector of said pair, and the focal points of the reflectors of each pair being coincident, and each of said units also including a single light source positioned in the common focal point of both reflectors of the pair, said upper light unit being adjustable about the vertical axis relative to the lower unit, said carriage being movable vertically on said support to move said units into and out of said casing, and means operable to effect rotation of said spindle.

ROYAL E. CROSSLEY.
HARLOW M. PATTAT.

REFERENCES CITED

The following references are of record in the file of this patent:

UNITED STATES PATENTS

| Number | Name | Date |
| --- | --- | --- |
| 310,728 | Schuette | Jan. 13, 1885 |
| 782,644 | Schulz | Dec. 13, 1904 |
| 782,297 | Webber et al. | Feb. 14, 1905 |
| 1,101,683 | Cote | June 30, 1914 |

FOREIGN PATENTS

| Number | Country | Date |
| --- | --- | --- |
| 27,919 | France | June 3, 1924 |
| 209,757 | Switzerland | Aug. 1, 1940 |
| 326,168 | Italy | May 2, 1935 |
| 496,619 | France | Apr. 9, 1919 |